United States Patent [19]

Saxmann

[11] 3,883,261

[45] May 13, 1975

[54] POWER MEANS

[76] Inventor: Paul E. Saxmann, 6120 E. 21st St., Indianapolis, Ind. 46218

[22] Filed: Aug. 13, 1973

[21] Appl. No.: 387,686

[52] U.S. Cl. ..................... 415/7; 415/202; 417/336
[51] Int. Cl. ........................................... F03d 11/04
[58] Field of Search .............. 415/2, 3, 4, 6, 7, 152, 415/164, 165, 202; 416/111, 119; 417/336

[56] References Cited

UNITED STATES PATENTS

| 9,551 | 3/1836 | Mercer | 415/152 |
| 244,221 | 7/1881 | Fountain et al. | 415/7 |
| 648,442 | 5/1900 | Scott | 415/4 |
| 657,528 | 9/1900 | Everson | 415/7 |
| 705,922 | 7/1902 | Gran | 415/7 |
| 1,631,647 | 6/1927 | Robinson | 415/7 |
| 1,892,831 | 1/1933 | Gega | 415/202 |
| 3,644,052 | 2/1972 | Lininger | 415/7 |

FOREIGN PATENTS OR APPLICATIONS

| 247,969 | 4/1927 | United Kingdom | 415/202 |

*Primary Examiner*—Henry F. Raduazo
*Attorney, Agent, or Firm*—Robert A. Spray

[57] ABSTRACT

A power means for obtaining useful power from moving fluid such as water waves or air motion, having an impeller body and an arrangement of baffle means for guiding the moving fluid to cause it to impart torque to the impeller.

4 Claims, 4 Drawing Figures

POWER MEANS

This invention provides novel and advantageous device for obtaining power, in a practical manner, from the practically unlimited natural phenomena of moving fluids such as water waves and moving air or wind.

It has of course been well publicized that mankind is currently facing both an "energy crisis" in which energy demands have in many places exceeded the energy production means, and also an "ecological crisis" in which environmental elements such as air have been polluted by many things including the raw materials by which useful energy is produced.

The present invention provides an effective answer to both of those highly-significant problems of mankind. For the source of power by water waves (particularly along shorelines) is practically unlimited, as is the presence of wind as a power source; and the obtaining of power by these devices can be used to provide electrical power by a pollution-free method which, in turn, can be utilized by the consumer to fulfill his special power needs by that electric power in a pollution-free manner.

These advantages are deemed to be so well known, considering all their publicity, and the long need for economical power, that the points will not be belabored by further explanation; for mankind has for ages recognized the unlimited source of water motion and air motion for power, and has tried many methods of harnessing that power. And all but the smallest child has been for years becoming increasingly aware of ecological needs which include the creation of a deliverable power and the subsequent conversion or obtaining of mechanical power from the deliverable power.

The above description is of an introductory and generalized nature. More particular details, features, components and concepts of the invention are set forth in the accompanying more detailed description of illustrative embodiments taken in conjunction with the accompanying somewhat schematic and diagrammatic drawings in which.

Figure 1:
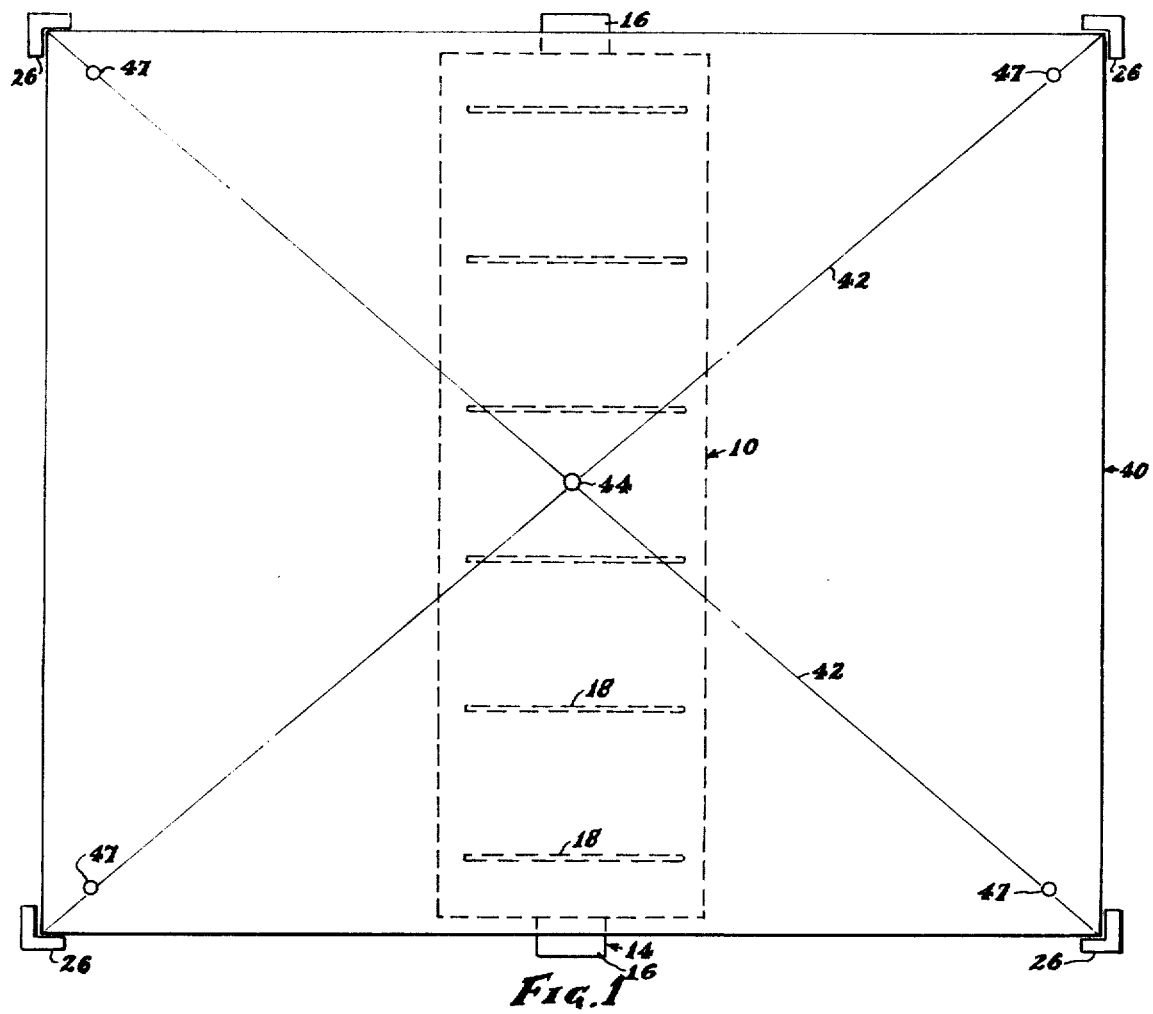
FIG. 1 is a plan view of an embodiment of the invention which utilizes the moving power of water waves together with wind and rain to achieve a power source.

As shown in the drawings the present inventive concepts provide a power source, utilizing the power of moving fluids such as water waves or air motion; and thus there is obtained a source of power from natural phenomena which are effectively infinite in availability and amount as a source for useful power.

Figure 2:
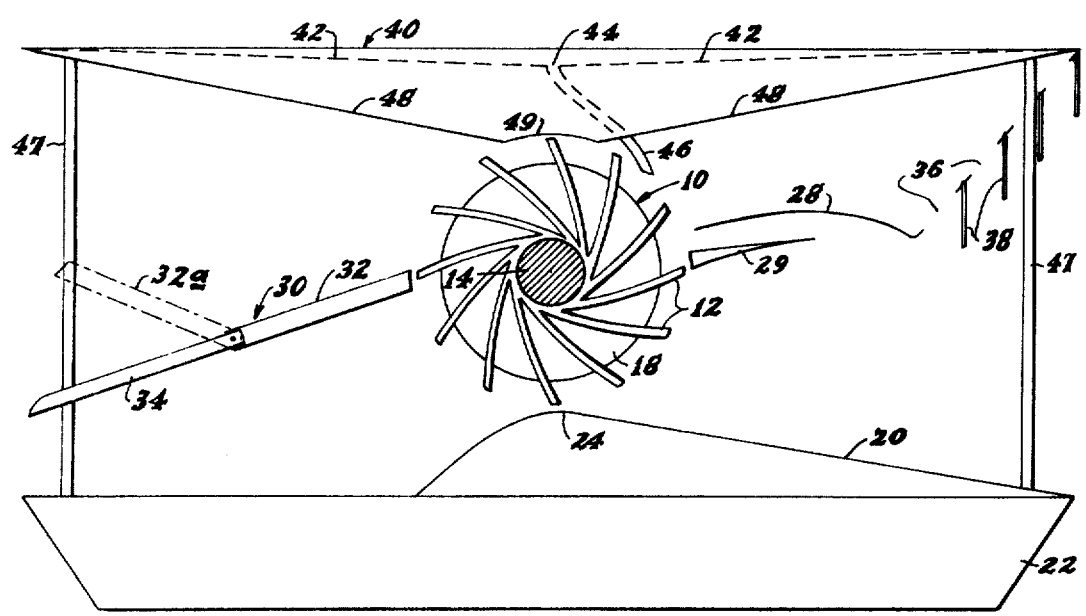
FIG. 2 is a side elevational view of the embodiment shown in FIG. 1.

In the embodiment of the invention shown in FIGS. 1 and 2, there is provided a power source which achieves power from moving water waves, but which also achieves supplemental power from the wind and even from the rain.

As shown in FIGS. 1 and 2, the power source includes an impeller body member 10 which comprises a peripheral series of blades or vanes 12 shown as slanted away from the hub 14 in a generally arcuate counter-clockwise form for achieving power as the impeller 10 is caused to revolve in a clockwise direction. It will be understood that the hub 14 is suitably supported at its ends 16, to permit the desired rotational movement of the impeller 10.

A series of discs or webs 18 are shown located at spaced intervals along the axis of the hub 14 of the impeller 10, in planes perpendicular to the hub 14. These provide a baffle or pocket effect for water or wind (as described below) which may be impingeing upon the impeller 10 in the obtaining of power as described below, in situations in which the moving fluid is coming thereagainst from a direction other than perpendicular to the impeller 10.

The water waves will be striking the device, in FIG. 2, from the right. As the water waves move leftwardly (FIG. 2), the under-portion (or undulation) impinges upon an inclined plane or rampage 20, which is a plane which increases in height in the downstream (leftward) direction, and this causes the under-portion of the water waves to be projected in a general upward movement which causes a cresting of the waves. The rampage 20 thus brings about the beginning of the wave cresting, the energy of which is utilized by this device for the production of power, for the water of those wave crests impinges upon the blades 12 causing the impeller 10 to revolve clockwise. In its leftward movement, the water is guided upward toward the impeller 10 by the inclined plane or rampage 20 which is mounted upon the device base 22.

The base 22 of the device is hollow for a sufficient amount of its overall shape that a flotation of the device is achieved such that the top 24 of the inclined plane or rampage 20 is riding substantially at the tide level of the water body. This provides that the leftwardly moving water waves will impinge upon the vanes 12 of the impeller 10 in the desired manner.

As shown in FIG. 1, pilings 26 are shown to maintain the general location of the device with respect to the water body and the shore, yet permit the device to rise and fall (as by tides, etc.) to maintain the above-mentioned desired height of the device with respect to the tide level.

A baffle 28 is shown extending on the rightward side of the impeller 10, at approximately the elevation of the axis of the hub 14; and this baffle 28 provides that water waves will be deflected sufficiently downward that they will impinge upon the impeller 10 only in the portion thereof which is at or below the axis of the hub 14, thus assuring that the water energy will cause only a clockwise rotation of the impeller 10, instead of any unusually high waves causing a retarding effect by pushing against the impeller at a higher level which would produce a counterclockwise component of force against the impeller 10.

Below that panel 28 there is a substantially parallel panel 29 which provides that water dropping downwardly from the panel 28 will continue to move leftwardly, achieving the desired rotational torque effect on the impeller 10, instead of merely dropping vertically in which some of the kinetic energy of the leftwardly movement of the water waves would be wasted.

This device also achieves a source of power from wind coming from the shoreward side, that is wind from the left travelling to the right in FIG. 2, as now is described.

There is shown a wind baffle 30 having a lightweight, moveable rightward portion 32, and a fixed leftward portion 34. When the wind is coming from the shore (that is, the wind is moving rightwardly in FIG. 2) the moveable panel 32 is in its position shown in FIG. 2, that is, its rightward position, which causes the rightwardly-moving wind to impinge against the vanes 12 of the impeller 10 in the portion above the axis of the impeller hub 14. This, of course, produces a clockwise torque upon the impeller 10 which supplements the above-described water power. This rightwardly-moving wind passes along the upper wall of baffle 28 and thereupon is vented at the right side of the device through openings 36 in the right end-portion of the baffle wall 28.

However, when the wind is coming from the water body, that is, when it is moving leftwardly from the right, the moveable lightweight panel 32 is blown by the leftwardly-moving wind to be in its chain-line position shown at 32a, to permit the venting of the wind through the upper left portion of the device. That is, it provides for the venting of wind which would enter the device and impinge upon the blades 12 in the same manner as the water power described above. Also, it will be noted that the rightward openings 36 are closed, when the wind is blowing leftwardly, by moveable closure plates 38 which close those openings 36 by leftward movement of the wind, yet permit those openings 36 to remain open in the situation of rightward movement of wind.

The device is covered by a hood or roof 40 shown as of generally rectangular shape but with ridges 42 to provide that the roof 40 has enough concavity to collect rain water. This rain water, in turn, passes through an opening 44 in the roof 40 which leads through a conduit 46 to a position adjacent the impeller 10 and on the right hand side (FIG. 2), providing that rain water striking the vanes 12 will also provide a supplementary clockwise torque to the impeller 10.

The canopy hood 40 is shown as supported from the base member 22 by four supporting posts 47, each located adjacent a corner of the overall device.

The roof 40 is shown as provided with a bottom wall 48 which provides a slanting surface above and at both sides of the impeller 10, these slanting panels 48 having at their juncture a downwardly concave cylindrical section 49 which provides a closure or housing-portion for the moving impeller blades 12.

Figure 3:
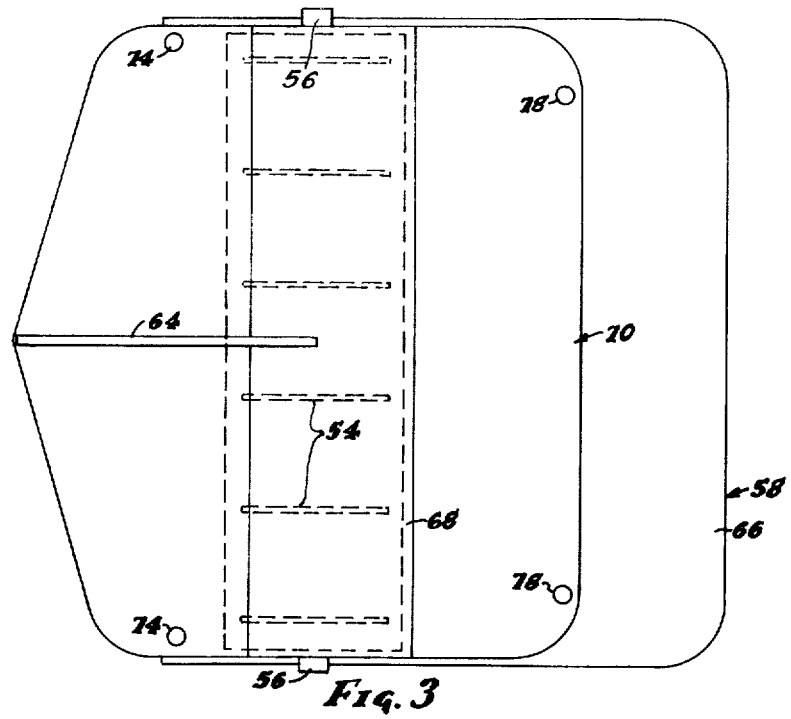
FIG. 3 is a plan view of an embodiment of the invention which utilizes wind power as a power source.
Figure 4:
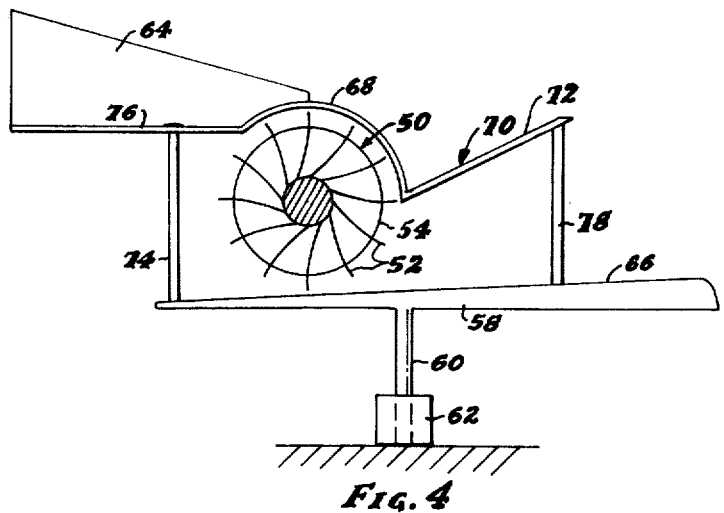
FIG. 4 is a side elevational view of the embodiment shown in FIG. 3.

In the embodiment shown in FIGS. 3 and 4, the device achieves power from wind, as a moving fluid. As shown, this device comprises an impeller body 50 with vanes 52 and axially spaced disc members 54 which may be substantially identical to impeller body 10 of the embodiment described above. This impeller body 50 has its ends 56 supported in suitable bearings, which provide that the impeller is located in a fixed position with respect to the device, but is rotationally moveable.

The device includes a base or frame section 58 having a downwardly-extending supporting post 60, which is freely rotatable within a supporting base 62; and the device is provided with a vertical panel 64 which provides a rudder by which the wind itself causes the device frame 58 to rotate (supporting post 60 with respect to base 62) so that the rotor or impeller 50 will present its axis perpendicular to the direction of wind travel, for maximum power effect and efficiency. The support post 60, it will be noted, is located in a location offset from the location of the fixed rudder vane 64, providing that the effect of wind against the rudder 64 will provide the rotational torque to orient the device as just mentioned.

The frame 58 is shown as a large panel, generally horizontal, whose upper surface 66 extends past the impeller 50 in a location closely spaced to the path of the outer tips of the impeller blades 52. The upper location of the path of the tips of the impeller blades 52 is shown as confined by a cylindrical portion 68 of an upper closure panel 70; and that upper closure panel 70, at the windward (right in FIG. 4) side of the impeller 50 is shown as provided by a slanting portion 72, which provides that incoming wind will be directed against only the lower portion of the impeller 50, thus achieving a clockwise rotational torque of that impeller 50.

The wind, which impinges against the impeller blades 52 (from the right of FIG. 4) exits from the device at the left end of the device, which is open. the lower frame panel 58 extends leftwardly only an amount sufficient to provide a base for a supporting post 74, which extends upwardly and supports a leftward portion 76 of the upper panel 70, which in turn supports the rudder vane 64. Adjacent the right end of frame 58 there are similar posts 78 which support the right hand portion 72 of the upper wall member 70.

It is thus seen that a power means according to the present inventive concepts provides a new and advantageous power means having advantages of ecology, practicality, a harnessing of practically unlimited natural forces with a minimum or zero pollution incidentals, etc., providing an economical and practically pollution-free energy source.

Accordingly, it will thus be seen from the foregoing description of the invention according to these illustrative embodiments, considered with the accompanying drawings, that the present invention provides a new and useful energy device, having desired advantages and characteristics, and accomplishing its intended objects, including those hereinbefore pointed out and others which are inherent in the invention.

Modifications and variations may be effected without departing from the scope of the novel concepts of the invention; accordingly, the invention is not limited to the specific embodiments or form or arrangement of parts herein described or shown.

What is claimed is:

1. Power means for obtaining useful power from moving fluid such as water waves or air motion, comprising:
    an impeller body member;
    means supporting said impeller body member for rotational motion about a horizontal axis; and
    baffle means for guiding the moving fluid to operatively impinge against the impeller body member to impart torque thereto in a certain rotational direction;
    in a combination with two vertically-spaced baffles on the side of the impeller body member from which the moving water comes, the upper one having means serving to confine the water so as to operatively impinge against the impeller body member only along the lower portion thereof which produces rotational torque in the said certain rotational direction, and the lower one having means serving to confine the water thus deflected by the upper one to cause it to continue to move to operatively impinge against the impeller body member in a torque-producing manner in contrast to merely dropping vertically and in effect losing some of its kinetic energy.

2. Power means for obtaining useful power from moving fluid such as water waves or air motion, comprising:

an impeller body member;

means supporting said impeller body member for rotational motion about a horizontal axis; and baffle means which defines the upper extent of the water impinging on the impeller body for guiding the moving fluid to operatively impinge against the impeller body member to impart torque thereto in a certain rotational direction;

in a combination in which, above the said baffle means which define the upper extent of the water impinging against the impeller body member, means provided with openings which are provided with wind-actuated closure members, which are moveable so as to be caused to close by wind coming from the direction of the water so as to block that wind from exerting a retarding torque against the impeller body in what would be the rotational direction opposite the certain direction of torque achieved by the water, but which are otherwise open, thereby to permit the exit of wind which has travelled in the opposite direction to impinge upon the upper portion impeller body member to cause supplementary power torque in that same certain direction as aforesaid.

3. Power means for obtaining useful power from moving fluid such as water waves or air motion, comprising:

an impeller body member;

means supporting said impeller body member for rotational motion about a horizontal axis; and vertically spaced baffle means for guiding the moving fluid to operatively impinge against the impeller body member to impart torque thereto in a certain rotational direction;

in a combination with means comprising a movable baffle member for utilizing the power of moving wind coming from the direction opposite that of the said moving water, the said baffle member being supported so as to have a lower position baffling wind to the upper portion of the impeller body member when the wind is coming from the direction opposite the moving water, thus blocking it from impingeing against the impeller body member in a manner to retard the torque in the said rotational direction, means on the baffle member to raise a portion thereof to an upraised position permitting exit of wind coming from the same direction as the water.

4. Power means for obtaining useful power from moving fluid such as water waves or air motion, comprising:

an impeller body member;

means supporting said impeller body member for rotational motion about a horizontal axis; and vertically spaced baffle means for guiding the moving fluid to operatively impinge against the impeller body member to impart torque thereto in a certain rotational direction;

in a combination with a baffle providing a lower panel for guidance of the water to the impeller body member is an inclined panel means which leads to substantially the path of the tips of the blade members of the impeller body member; and in which the said lower panel inclination causes the under-portion of the water waves to be projected in a general upward movement which causes a cresting of the waves, the breaking of the wave creating being a major contributor of energy utilized in imparting torque to the impeller.

* * * * *